United States Patent [19]

Bolger

[11] Patent Number: 4,836,344

[45] Date of Patent: Jun. 6, 1989

[54] ROADWAY POWER AND CONTROL SYSTEM FOR INDUCTIVELY COUPLED TRANSPORTATION SYSTEM

[75] Inventor: John G. Bolger, Orinda, Calif.

[73] Assignee: Inductran Corporation, Berkeley, Calif.

[21] Appl. No.: 47,284

[22] Filed: May 8, 1987

[51] Int. Cl.$^4$ .............................................. B60L 9/00
[52] U.S. Cl. ........................................ 191/10; 191/15
[58] Field of Search ............... 191/10, 13, 15; 246/31, 246/202

[56] References Cited

FOREIGN PATENT DOCUMENTS 2820888 11/1979 Fed. Rep. of Germany ........ 191/10
9983 of 1892 United Kingdom ................... 191/10

Primary Examiner—Henry A. Bennet
Attorney, Agent, or Firm—Owen, Wickersham & Erickson

[57] ABSTRACT

An electrical modular roadway system adapted for transmitting power to and controlling inductively coupled vehicles traveling thereon. The system comprises a plurality of elongated, electrically connected inductor modules arranged in an aligned end to end spaced apart order to form a continuous vehicle path. Each module has a magnetic core and power windings which generate a magnetic field extending above the road surface. Controllable relays are connected between modules for allowing operating electric current to either activate or bypass selected modules. Sensing windings in modules are activated by the presence of a vehicle on one module to provide control signals to relays for other modules.

17 Claims, 9 Drawing Sheets

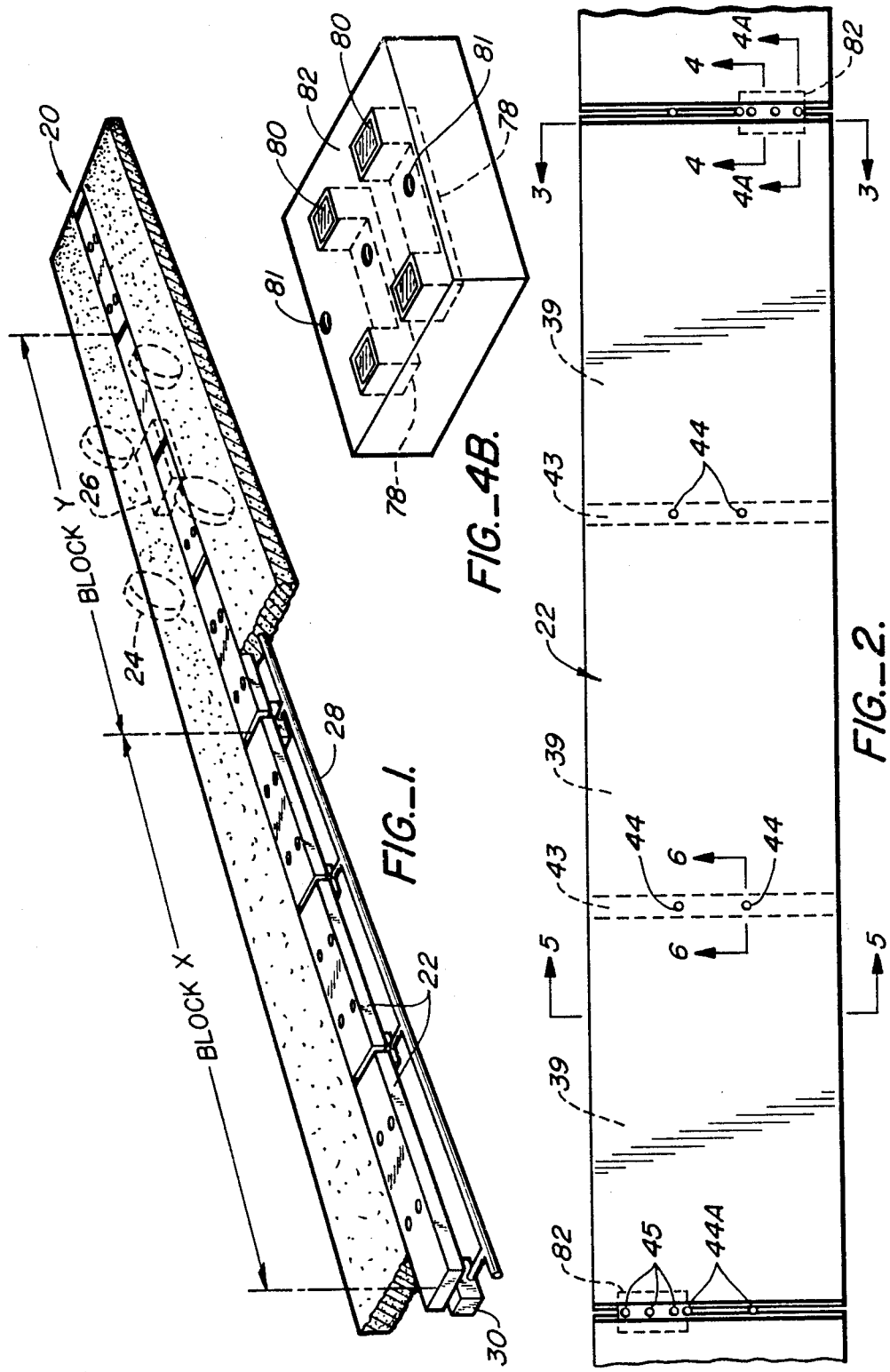

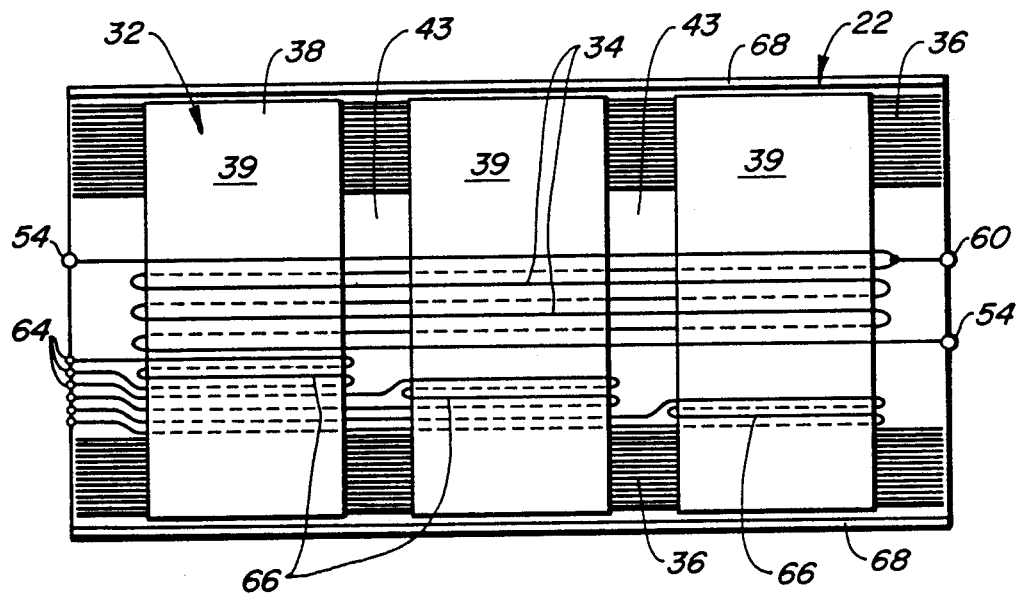
FIG._2A.
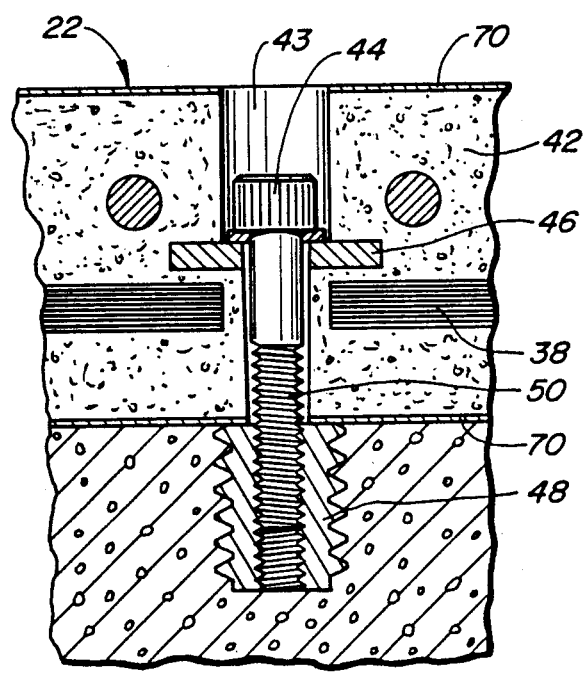
FIG._6.

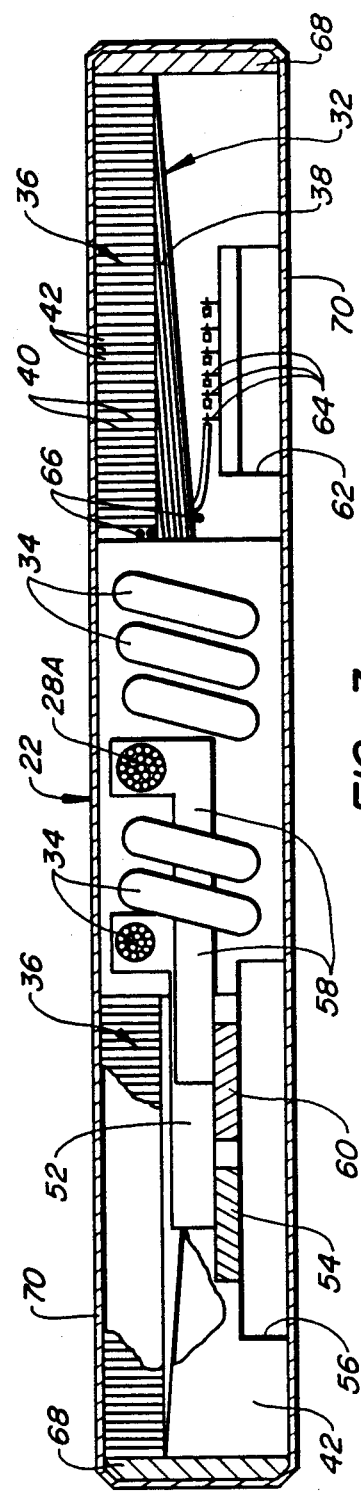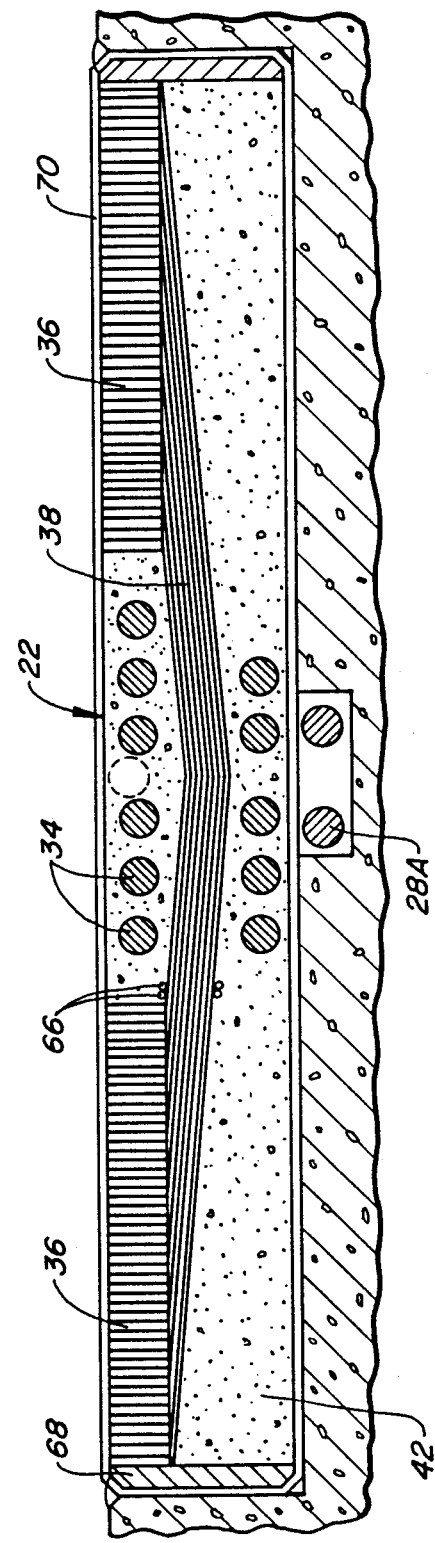

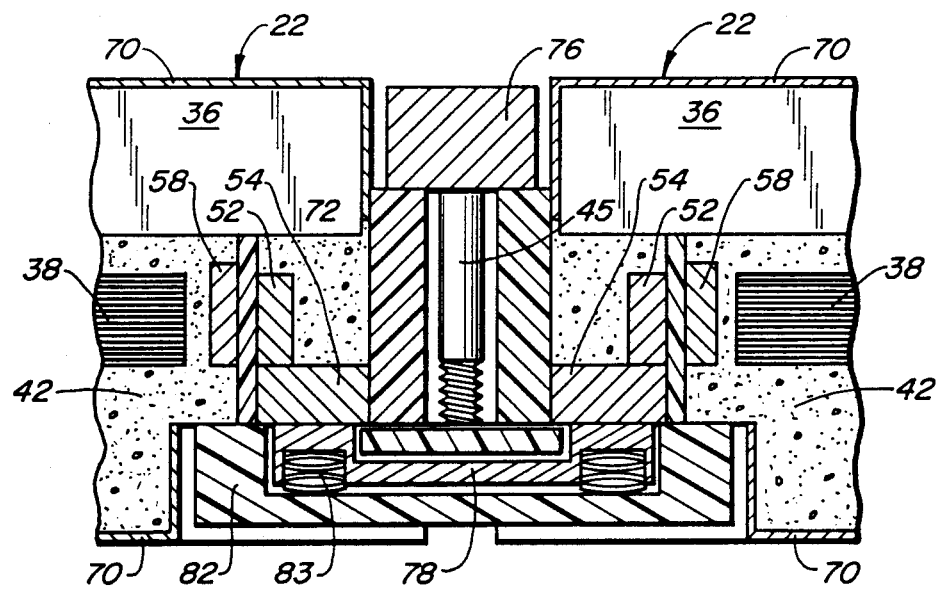
FIG._4.
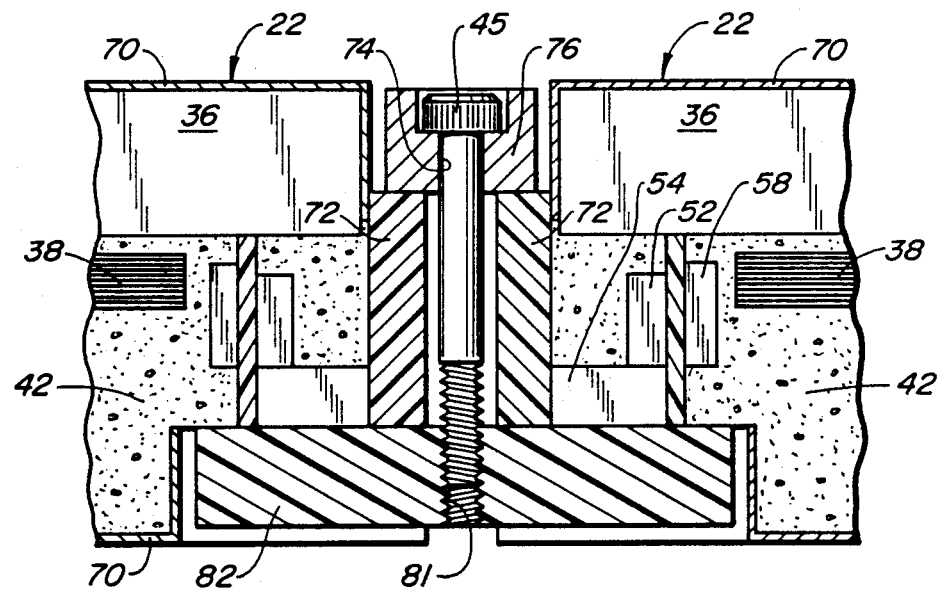
FIG._4A.

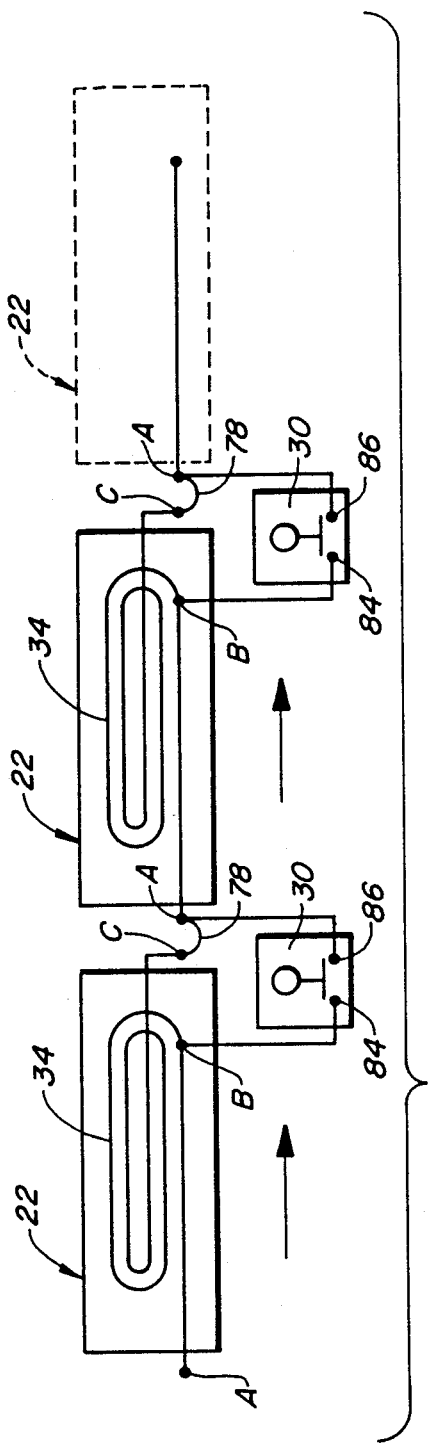
FIG._7.
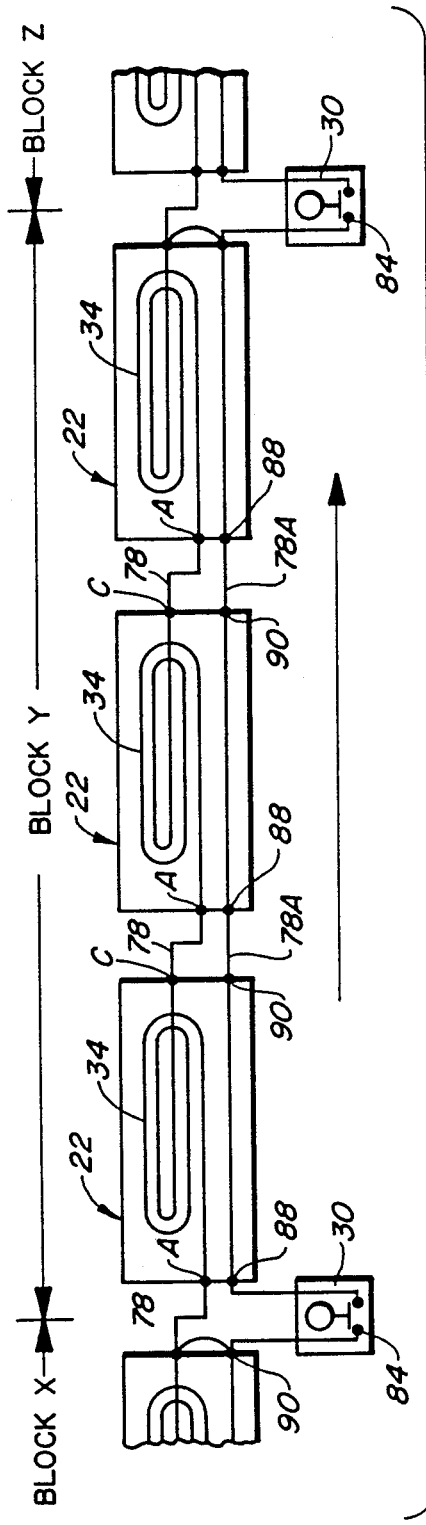
FIG._8.

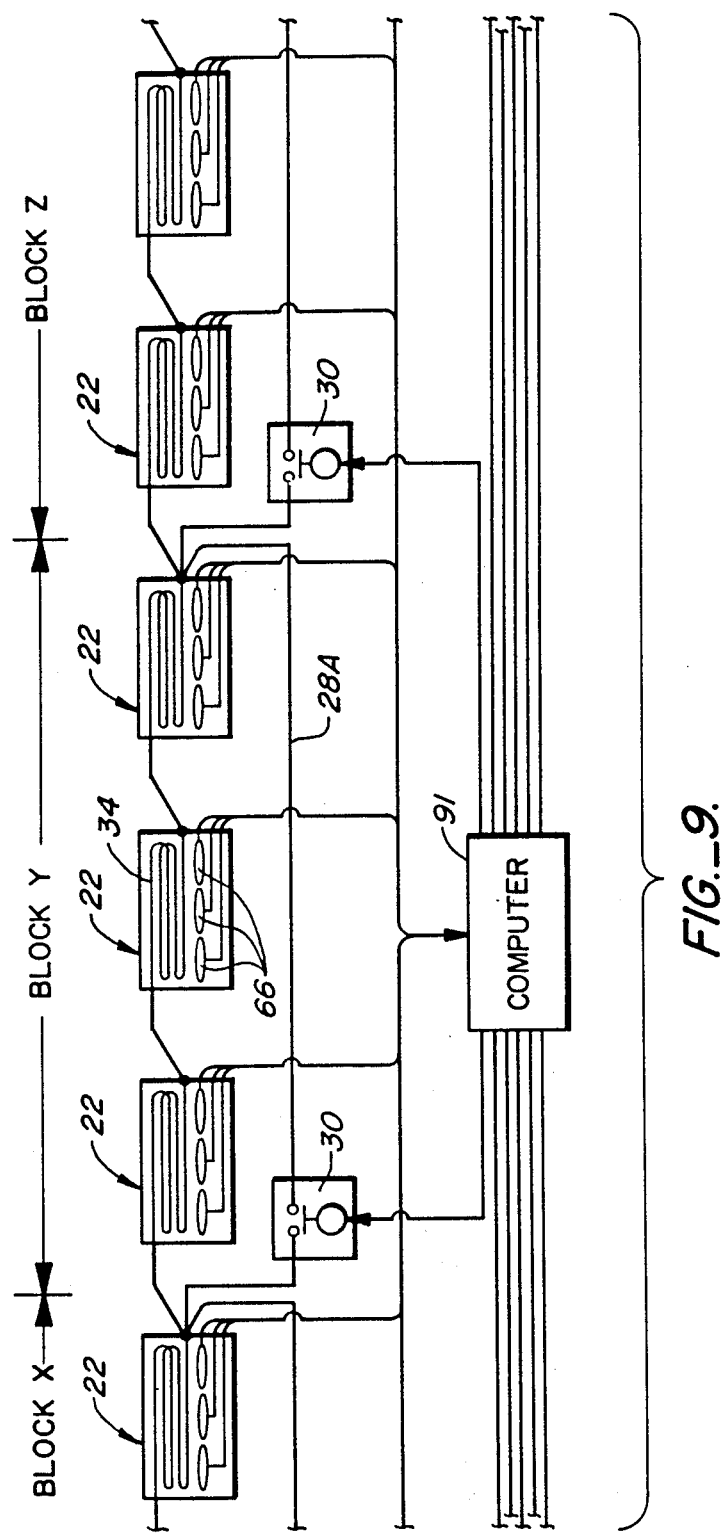

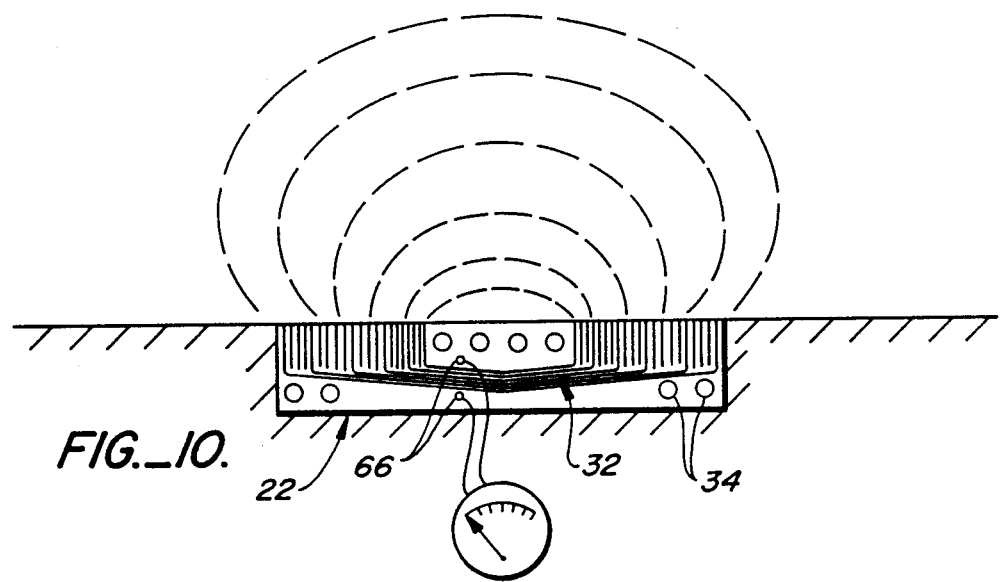
FIG._10.
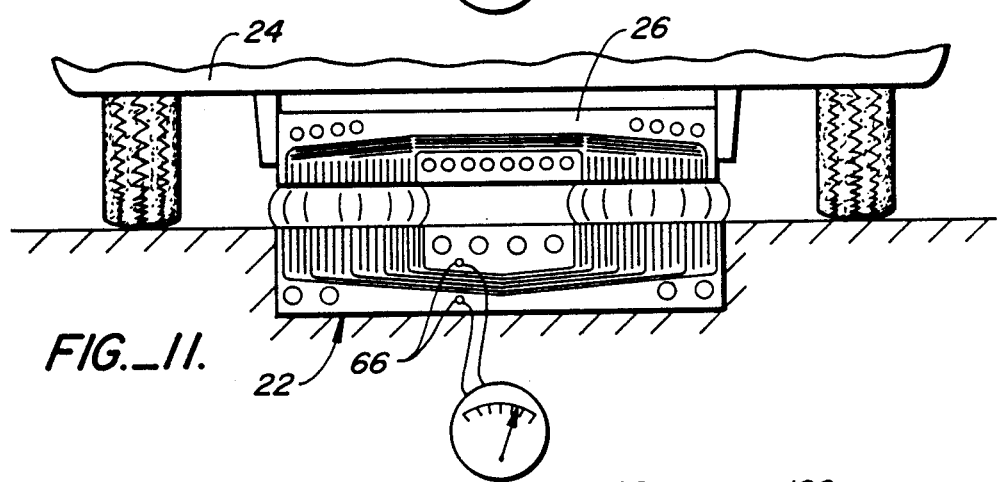
FIG._11.
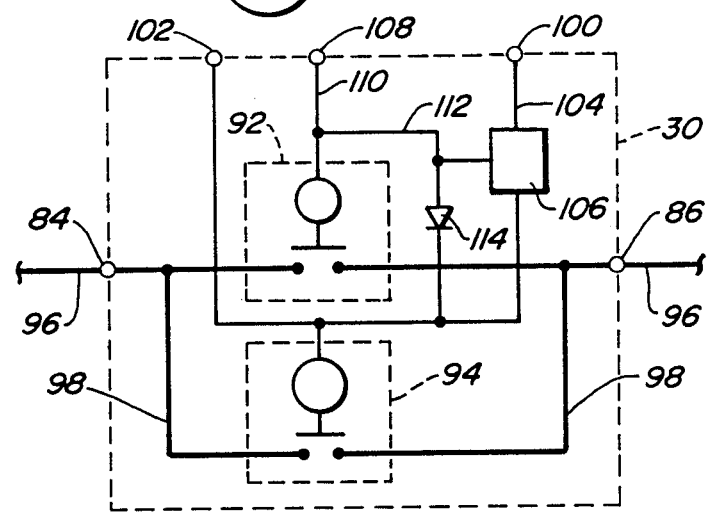
FIG._12.

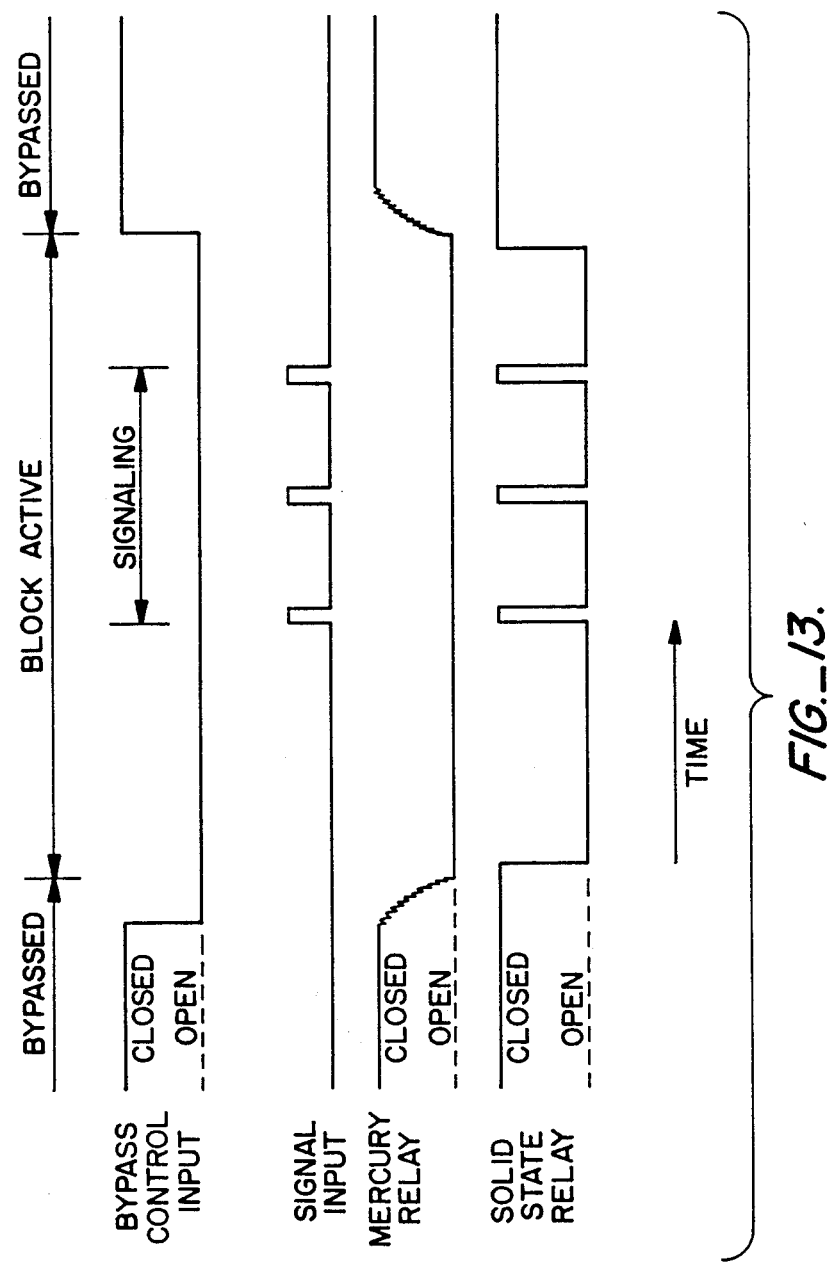
FIG._13.

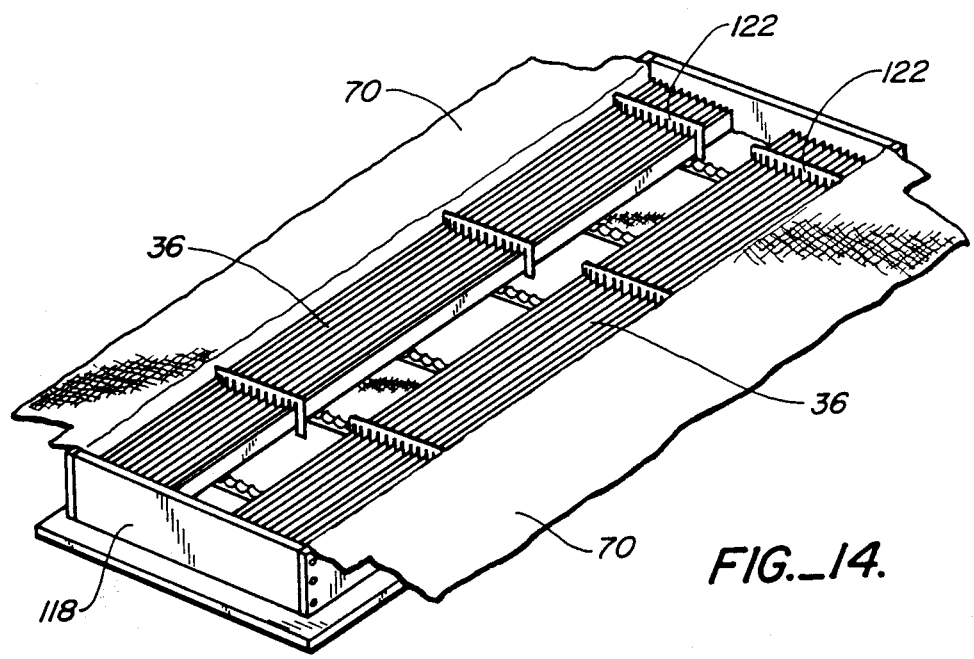
FIG._14.
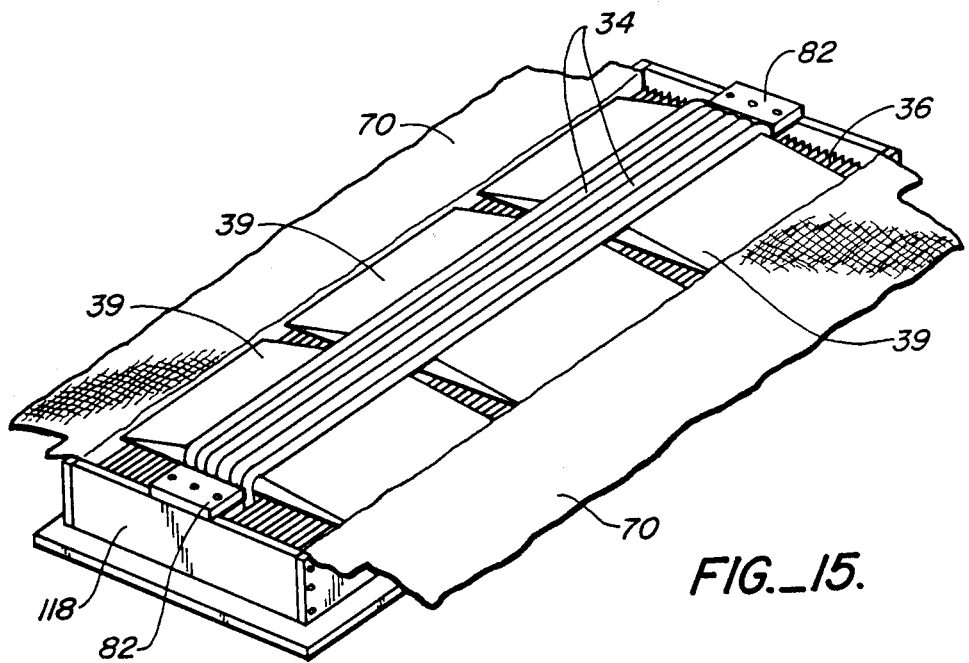
FIG._15.

ROADWAY POWER AND CONTROL SYSTEM FOR INDUCTIVELY COUPLED TRANSPORTATION SYSTEM

This invention relates generally to vehicular transportation systems, and more particularly to transportation systems wherein a vehicle receives operating power by magnetic induction from the roadway on which it is traveling.

BACKGROUND OF THE INVENTION

In "people moving" transportation systems for urban areas, increased passenger throughput, low operating cost, and operating flexibility are essential factors for satisfying growing transportation needs. Such factors can be provided only by highly automated systems. Heretofore, automated transit systems utilizing computer devices for controlling speed headway have been applied to electric rail systems for both steel wheel and rubber tired vehicles. Prior developments have also included combustion engine powered vehicles guided and controlled from signals emanating from a buried wire. None of these technologies have projected or demonstrated the capability of safely operating vehicles at the high speed and very close headways commensurate with very high passenger throughput while maintaining the operating flexibility that is necessary.

Inductively coupled rubber tired transit systems as described in U.S Pat. Nos. 3,914,562 & 4,331,225 have demonstrated the potential for satisfying the above requirements. These systems can not only transfer power, but can also provide guidance and control inputs to vehicles (magnetically) from an inductor in the roadway to a receiver inductor in the vehicles. Such an arrangement would allow vehicle routes to be switched and reset almost instantaneously by electromagnetic means. Moreover, since power collectors require no physical contact with the roadway, major mechanical constraints to vehicle operation are removed.

Inductively coupled power systems for electric vehicles heretofore disclosed utilized a continuous power inductor which required a large amount of ampere turns in the roadway inductor in order to transfer the required power. This not only increased overall input power requirements but also made it necessary to constrain undesirable electromagnetic effects on adjacent structures or devices to tractable levels. In such inductive power systems, the ampere turns are required only at positions where vehicles are coupled. However, it is not feasible to separately supply and to switch on and off only the short sections of a continuous roadway inductor that are occupied. It is therefore desirable to operate a roadway power system ('powerway') as extended constant current series circuits, supplied by periodic large power supplies, rather then the costly alternative of using many shorter individual circuits with smaller power supplies. Moreover, it is not feasible to use long continuous bus conductors to supply shorter sections, since the current delivered to the sections would vary widely, depending on the impedance of the particular coupled load.

Accordingly, one general object of the present invention is to provide an improved roadway for an inductively powered transportation system.

Another object of the invention is to provide an inductively powered roadway comprised of a plurality of connected power modules that can be operated as a large series circuit while providing the alternative of activating or deactivating short sections of the roadway as vehicles move over it.

Still another object of the invention is to provide an inductively powered roadway comprised of a plurality of connected power modules with relay means between the modules that enable current supplied to a particular module to bypass the power induction coils to deactivate the module when a vehicle is not on it.

Another object o the invention is to provide an improved inductively powered roadway system comprised of a plurality of modules connected in series and utilizing a vehicle sensing means on each module for controlling bypass means capable of activating or deactivating certain modules forming the roadway.

Another object of the invention is to provide a unique hybrid relay for controlling power to or bypassing one or more modules in an inductive power roadway.

Yet another object of the invention is to provide a unique inductive power module construction and a method for fabricating such modules with ease and economy of manufacture

SUMMARY OF THE INVENTION

The present invention overcomes many problems of friction drive systems, trolley and third rail powered systems, and enhances induction drive system capabilities through the unique arrangement and control of a plurality of induction modules placed in end to end alignment and connected to form a novel power roadway construction. Each induction module is constructed with a flux carrying core having opposite spaced apart pole sections connected by a cross core or bridging section around which are wound a plurality of power inductor coils. In a powered roadway according to the invention selected modules are equipped with a relay of a unique design that functions to bypass or short circuit the inductor coils that are not required at the time when the controlled module can be rendered inactive when a vehicle is not over the module, thereby lowering the unnecessary power consumed by the module. Bypassing power to the module can also serve to provide a remote controlled stopping means for vehicles in the roadway when necessary. Such relays may be connected to each module or to spaced apart modules in order to control pairs or groups of modules. The relays may be operated by sensing coils in each module that sense the approach of a vehicle or by automation control of the system using a central computer. Each relay according to the invention utilizes a mechanical contact in parallel with a solid state switching circuit, the former to avoid power losses and the latter to prevent arcing. Each sensing coil acts as a secondary of a transformer of which the primary is an adjacent power inductor coil. Thus, as a vehicle approaches a module in the roadway, it increases the density of the magnetic lines of flux in a sensing coil below the vehicle, causing a signal to be transmitted to the appropriate controlling relay and thereby temporarily decreasing the power available to a vehicle from the module being controlled.

The use of roadway inductor modules according to the invention and the power that they must transfer in a non-steady state manner has required the development of a novel module fabrication process. This fabrication method comprises inserting the coils and core of the module into a mold lined with reinforcing cloth, typically a glass fiber or other suitable high tensile material; filling the voids in the mold with sand; covering the upper surface with reinforcing cloth and impregnating the entire mold with a suitable potting resin. The resulting modules comprise a sturdy, weather resistant, easily replaceable structure that is still relatively easy and inexpensive to construct and yet capable of handling the large forces required for vehicle support on a roadway.

Other objects and features of the invention will become apparent from the following description taken in conjunction with the accompanying drawings.

BRIEF DESCRIPTION OF DRAWINGS

FIG. 1 is a view in perspective of an inductive power roadway embodying principles of the present invention with a vehicle for said roadway, having an inductive power receptor, shown in phantom.

FIG. 2 is a fragmentary plan view of a single inductor module for the power roadway of FIG. 1.

FIG. 2A is a diagramatic plan view of a single module showing the power coils and sensing coils.

FIG. 3 is an end view in elevation and in section of the inductor module, taken along line 3—3 of FIG. 2.

FIG. 4 is an enlarged view in section taken along line 4—4 of FIG. 2.

FIG. 4A is an enlarged view in section taken along line 4A—4A of FIG. 2.

FIG. 4B is a view in perspective of an electrical interconnect block for adjacent modules.

FIG. 5 is an enlarged view in section taken along line 5—5 of FIG. 2.

FIG. 6 is an enlarged view in section taken along line 6—6 of FIG. 2.

FIG. 7 is a diagrammatic view of one arrangement for the connection of modules and relays according to the invention.

FIG. 8 is a diagrammatic view of another embodiment of the invention showing modules utilizing a bypass conductor with relays controlling a plurality of modules.

FIG. 9 is a diagrammatic view of another form of the invention utilizing sensing coils in the modules that form a roadway.

FIG. 10 is a diagrammatic view in elevation and section showing an installed inductor module with its typical magnetic field.

FIG. 11 is a diagrammatic view in elevation and in section similar to FIG.10, but showing a vehicle directly above with its power receptor inductively coupled.

FIG. 12 is a circuit diagram for a hybrid relay embodying principles of the present invention.

FIG. 13 is a timing diagram representing the operation of the roadway embodiment of FIG. 8.

FIG. 14 is a view in perspective showing basic components of a power module as it is being assembled according to the invention.

FIG. 15 is another view in perspective showing the power module of FIG. 14 after its cross core sections have been installed.

DETAILED DESCRIPTION OF EMBODIMENT

With reference to the drawing, FIG. 1 shows a portion of powered roadway 20 embodying principles of the present invention and comprising a series of induction modules 22 that are aligned end to end but slightly spaced apart to form a vehicle path. The modules are embedded in the ground so as to be flush with the roadway surface over which a vehicle 24 (shown in dotted lines), can travel. The vehicle, such as the one described in my previous U.S Pat. No. 4,331,225 has a power receiving device 26 which becomes inductively coupled with the inductor module in the roadway directly below to receive power for moving the vehicle over the roadway. Extending parallel to the aligned inductive modules 22 is an electrical bypass conductor 28 which originates from an electrical supply means (not shown) and is connected to the series of aligned modules forming the powered roadway. In accordance with an important feature of the invention bypass relay devices 30 are connected between adjacent pairs of aligned modules, so that when no vehicle is on a particular module and the module is therefore not required to be activated, current normally supplied to that module can be bypassed (with minimal losses) to another module in the roadway.

In its preferred form, each module 22 is an elongated structure of uniform width and thickness, so that they can be easily fabricated in quantity and readily installed in a roadbed with a minimum of labor and equipment. Typically, for straight sections, as shown in FIG. 2, a module may be roughly 3 feet by 10 feet and around 3 inches thick. The module dimensions may vary within the scope of the invention and in some instances the modules may be slightly curved in planform to fit a particular roadbed configuration.

As shown by the cross sectional end view of FIG. 3, each module 22 according to the invention comprises an iron core 32 around which is wrapped a power winding 34 comprising a series of coils. The core has two spaced apart pole sections 36 with interconnecting cross core or bridge member 38 extending between them. The pole sections are each formed from a series of parallel, spaced apart narrow strips 40 of a magnetic metal such as iron between which is a dielectric material 42 such as sand mixed with a suitable plastic or potting resin. The bridge or cross core member 38 is similarly formed from laminated sheets of similar metal material that extends across and contacts the pole sections. Preferably the cross core member 38 is made in three similar sections 39 of the same length which are spaced apart at intervals 43 along the module, as shown in FIG. 2. A more diagrammatic view of the module 22 is shown in FIG. 2A which illustrates the coils of the power winding 34 around the core 32 and having end terminals 54 and 60. Also shown are sensing coils 66 which extend around each cross core member 38 and have terminals 64 at one end of the module At the spaced apart intervals 43 along its length, as shown in FIGS. 2 and 6, each module 22 may be secured more firmly to the ground below by a pair of spaced apart, recessed metal anchor bolts 44. Each bolt has an enlarged head that bears against a washer 46 which is embedded in the module. A serrated bolt anchor 48 embedded in concrete below the module is adapted to receive a threaded shaft portion 50 of each bolt 44 thereby securing the module to roadbed foundation material.

At each of its ends, the module 22 is provided with suitable connecting terminals to facilitate the interconnections of adjacent modules in a roadway. As shown in FIG. 3, a conductive strap 52 is attached to each end of the power conductor winding 34. This strap extends to one side of the module centerline and contacts a winding terminal 54 within a cavity 56 for a recessed interconnect block 82 located on the module underside and shown in FIGS. 4, 4A and 4B. In the embodiment of FIGS. 2-6, a bypass conductor 28A is mounted within and extends along the length of the module. A conductive strap 58 is attached to the end of the bypass conductor and extends laterally to a bypass terminal 60 which is also located within the module cavity 56. On the other side of the module centerline is another recessed cavity 62 for a series of terminals 64 for securing and interconnecting a series of sensing coils 66 provided in each module 22. As shown in FIG. 2A, three sensing coils 66 are provided, each being wrapped around one of the cross core sections 9 of the module and each sensing coil being connected to a pair of terminals 64 within the cavity 62. The sensing coils are made from wire which is considerably smaller than the power conductor winding and they are conveniently located between strips of the elongated pole section of the core.

As shown in FIG. 3, the module is provided with rigid sidewall members 68, and the resin encased core and components are preferably covered by an exterior layer 70, such as a heavy knitted fiberglass cloth.

As the modules 22 are installed end to end to form a powered roadway, they must be electrically connected in a manner that provides ease of installation and a reliable and durable electrical connection. As shown in FIG. 4, the modules are spaced apart to allow for thermal expansion. Rigid cross members 72 of non-conductive material are provided at the ends of each module 22 to support a bolting strip 76 having bores 74 for receiving a plurality of spaced apart tie-down bolts 44A, similar to the anchor bolts 44 previously described relative to FIGS. 2 and 6. Although not shown in the section FIGS. 4 and 4A, the head of each bolt 44A is supported by the bolting strip 76 that bears against the cross members 72, and its lower end is threaded to an embedded anchor member (not shown).

The interconnect block 82 is retained within the cavities 56 of adjacent modules by bolts 45 which also extend through the cross member 72, as shown in FIGS. 4 and 4A. The lower ends of these bolts are threaded into holes 81 provided at spaced apart locations in the block 82. Within block 82 electrical connections between the power conductors 34 of adjacent modules 22 are provided by an electrical jumper 78 having enlarged end contacts 80 that engage the winding terminals 54 within the interconnect cavities 56 of adjacent modules. The block 82 serves as a retainer member which extends over the jumper 78, and internal belleville springs 83 inside the block bear against the ends 80 of the jumper. A similar jumper arrangement is provided for the bypass conductor 28A, but is not shown in FIG. 4. When the interconnect block 82 with its electrical jumpers is pulled firmly up against the bottom of the adjacent modules 22 by bolts 45, reliable electrical connections are maintained between the engaging contacts 80 and terminals 54.

In FIG. 5, the module 22 is shown in cross section as it appears when installed or embedded in the ground or in surrounding roadway material. Although the bypass conductor 28A is shown within the module in FIG. 3, it could also be installed outside of it, e.g. underneath the module along its centerline, as in FIG. 5, or to one side, as shown in FIG. 1.

In accordance with the principles of the invention the relay 30 may be provided between each pair of adjacent modules or between groups or blocks of modules that may comprise two, three or more modules in each group. The basic principle of the function of the relay 30 may be illustrated by reference to FIG. 7. As shown, here a relay 30 is provided between each pair of adjacent modules 22 each of which has a single power winding conductor 34 having a plurality of coils with an inlet terminal A at one end of the module and an outlet terminal C at its other end. The inlet and outlet terminals of adjacent modules are connected by a jumper 78. Each relay 30 has a first contact terminal 84 connected to a terminal B located near the end of the first power coil on the module and a second contact terminal 86 connected to the inlet terminal A of the next module 22. When the contacts 84 and 86 of the relay 30 are open, current will flow in the power winding conductor 34 from the inlet terminal A to its outlet terminal C and then to the inlet terminal A of the next module, thereby inductively activating the magnetic core of the first module. Now, conversely, if the relay contacts 84 & 86 are closed, so that current can flow through it, the current through the first coil of the conductor winding 34 will flow from the contact B directly through the relay. Thus, when the relay contacts are closed, current is diverted from and bypasses all but one of the coils of the main power winding conductor so that the module becomes inactive, and any vehicle on that module cannot receive an adequate amount of power from it inductively. If desired, the relays 30 could be placed between pairs of connected modules so that only one relay could control two modules in the aforesaid manner.

A somewhat modified arrangement for connecting the relays 30 may be described in FIG. 8. Here, an extra bypass conductor 28A is utilized which may be included within the module itself (with terminals at opposite end thereof) or furnished externally of the aligned modules. In either case the bypass conductor can be relatively large in diameter so that its necessary current carrying function can be accomplished with minimal electrical resistance and losses. In this arrangement, the module power conductor winding 34 has inlet and outlet terminals A and C on each module and for adjoining modules that are connected by a jumper 78. In the embodiment of FIG. 8, a single relay 30 controls a block "Y" of three modules which are connected by jumpers 78. Here, each module also contains a separate bypass conductor 28A having input and output terminals 88 and 90 at opposite end of back module which are connected by independent jumpers 78A between modules. The relay 30 which controls the block "Y", has one contact 84 connected to both the output terminal C of the power conductor winding 34 and the output terminal 90 of the bypass conductor for the preceding module of the preceding block "X". The other relay contact 86 is connected to the inlet contact 88 for the bypass connector on the first module of the block "Y". Thus, when the contacts 84 and 86 of the relay 30 are closed, current from the module of block "X" will flow into the bypass conductor 28A for the modules of block "Y". This deactivates all of the modules of block "Y" and an inductively powered vehicle thereon will cease to operate. Depending on the status of the next controlling relay, the block it controls will be either active or inactive in like manner.

As previously described, high level vehicle detection signals are developed in the sensor coils 66 which are wound around each of the cross core sections 39 of an inductor module 22, whenever a power coupling vehicle is above a sensor coil. As shown in FIG. 10, when no vehicle is above an activated module, its inductor core produces a magnetic field directly above it, as indicated by the dotted lines of force. At this point since the magnetic field has no low reluctance inductive path, no significant voltage is induced in the sensor coil or loop. Now, as shown diagrammatically in FIG. 11, when a vehicle moves into the magnetic field its power receptor 26 provides a low reluctance path for the magnetic flux derived from the roadway, and this in turn, also produces a voltage in the sensor coil 66 which is sufficient to serve as a detection signal indicating the presence of a vehicle at the location of the particular sensor loop. These sensory outputs are highly reliable since electrical contacts are not present and a high level, low impedance signal source is provided.

In FIG. 9, is schematically shown another modified form of a power roadway system, using modules 22 according to the invention having sensor loops 66 which are connected to a computer 91. Here again, a plurality of modules 22 are connected in blocks, each of which is controlled by a relay 30, in the manner described relative to FIG. 8. Detection signals generated by the sensors whenever a vehicle is present above a sensor loop of a particular module are processed by the computer logic system. The latter can then produce output control signals to an appropriate controlling relay 30 for a specific module block. Since the center to center distance between cross cores in a module 22 is typically about three feet, the resolution of vehicle detection and thus its actual location will also be determined within three feet. Also, using such sensor input data, the speed of vehicles can be continuously determined from the rate of progression of detections by the computer.

Detection signals can be used in two ways to g prevent collisions between adjacent vehicles. In one arrangement, they can be entered in a system control computer, where the locations and speeds of all vehicles in the system can be monitored and controlled in real time, or detection signals can be used to directly operate electrical controls that can prevent collisions. In either arrangement, the modular construction of the roadway 20 according to the invention provides an important collision protection advantage. Only modules 22 of the roadway that are occupied or about to be occupied are actively powered while the current in other unoccupied modules is bypassed by control relays 30. For example, the detection signals produced the sensor in each module can be used to prevent activation of inductor modules in a zone behind each vehicle. Thus other vehicles entering the unpowered zone would be deprived of propulsion power and would come to a stop before a collision could occur.

The relay 30 for the powered roadway 20 are subject to long periods of use and yet must be highly reliable and efficient. In FIG. 12, a circuit diagram is shown for a relay 30 which fulfills these stringent requirements. This relay is, in effect, a hybrid relay in that it incorporates two switching elements of different characteristics in parallel, namely a mercury relay 92 and a solid state relay 94.

As shown in the diagram, a main power input lead 96 is connected to a pair of terminals 84 and 86 on opposite sides of the relay. Internally, a branch lead 98 is connected in parallel to the input power lead 96. The mercury relay 92 is connected so that its contacts can open and close the power lead inside the relay 30. The solid-state relay 94 is connected so that its contacts can open and close the conductive path through the parallel branch lead 98. Two additional terminals 100 & 102 are provided on the exterior of the relay 30. A first input terminal 100 receives power from a D.C. supply and is connected via a lead 104 to a turn-off time delay element 106, which in turn is connected to the solid-state relay 94. A second signal input terminal 108 receives control signals either from a central computer 91 or directly from a module sensor 66, as described above. A lead 110 from the sensor input terminal 108 is connected directly to the mercury relay 92, and a branching lead 112 therefrom passes through a diode 114 and is connected to the solid state relay 94.

Operation of the relay 30 may be described as follows:

When the relay is in its closed condition, the powerway current flows through the relay terminals 84 & 86 and the contacts of the mercury relay 92. This causes current to flow in the "bypass" conductor 28 for the inductor modules of the block, thereby deactivating the roadway block. The solid state relay 94 is 'enabled' by current from a power supply, although little or no bypass current flows through it because the paralleled mercury relay 92 causes less voltage drop than is required to overcome the nominal bias requirements for the semiconductor switches in the solid state relay 94.

When a vehicle approaches the block in the roadway, the bypass control signal at the terminal 108 is removed from the block relay. The signal is also removed immediately from the mercury relay, which requires a major fraction of a second to open fully. The signal is also removed from the input to the time delay element 106 which thus causes a delay of approximately a second before removing the 'enabling' input from the solid state relay 94. Thus the bypass current will transfer from the mercury relay 92 to the solid state relay as the mercury relay slowly opens. This greatly reduces the stress and wear on the contacts in the mercury relay and largely eliminates radiated electrical noise due to arcing. After the mercury relay has fully opened, delayed opening of the solid state relay will occur at a zero current crossing, which also minimizes electrical stress on that relay.

When a vehicle is in the block being controlled by the relay 30 connected thereto, and it is desired to communicate a 'speed code' or other data to it, the power in the block can be interrupted in a series of short pulses whose intervals are representative of a particular data element. In order to do this, a signal is sent to the block relay with the desired pulse format; this signal is applied only to the solid state relay. The short on/off signal pulses cause only the solid state relay to bypass the current in the block and thus cause no wear on the mercury relay. The short 'off' periods are a very small percentage of the signalling period, and hence have little effect on the power that is available to vehicles form the inductor in the block. These pulses are readily detected on the vehicles, either through the power coupling or with a separate electromagnetic sensor.

After the vehicle has left the block, it is desirable to once again bypass the current in the powerway inductors in order to reduce the resistive losses, and to prevent that any unauthorized vehicles from obtaining propulsion power in the block. To accomplish this, as shown in the timing diagram of FIG. 13, the bypass control signal is applied to the block relay. This will immediately turn on the solid state relay (at the first zero current crossing) and will also start closing the mercury relay. When the mercury relay has completed its closure, current will transfer from the solid state relay to the mercury relay, eliminating the conduction losses in the solid state switches, and the contacts in the mercury relay will have been protected against arcing and wear.

It will be apparent to those skilled in the art that the block relay 30 can also be constructed using a normally closed mercury relay, which has some functional advantages.

In use, the block relay 30 can be held in a 'bypassed' condition to protect vehicles ahead from collision. This can be accomplished by applying a bypass control input from the system control computer. Alternatively (or additionally), voltage from vehicle detection coils in inductors ahead can be applied to the bypass control input through an 'or' gate. This method has the advantage of requiring no action by a computer in order to provide collision protection.

The construction of the inductor modules 22 presented a difficult production problem which was solved by the method described below with reference to FIGS. 14 and 15. This method of fabricating the modules according to the invention allows a pre-assembly of module components to be placed in their functionally appropriate positions and then bonded into a structurally strong, beam-like module with good electrical integrity, and fully capable of withstanding traffic loads, vibrations and displacements that normally occur on roadways.

A first step of the method is therefore to provide a mold structure 118 having a cavity with the proper dimensions for the finished module product. In a second step the open mold is lined with a layer of fiberglass cloth 70 and the rigid side and end members 68 and 72 are placed therein. Next the module elements including the core 36 and power inductor coils 34 are arranged within the mold cavity in their proper order and spacing, but in an inverted position. The spaced apart thin steel core strips are first placed at the bottom of the mold to form the inductor poles 36. Comb-like devices 22 are utilized to maintain the required uniform spacing between pole strips. Use of the thin steel strips reduces eddy current losses and with their length they form a strong, beam-like structure. Dry, course sand is used to fill the spaces between the strips, and the combs 122 are then removed. The power conductor winding 34, constructed of bare stranded electrical cable is placed along the centerline of the of the assembly and connected to the terminals at opposite ends of the module. The cross core sections 39 are next placed in position through the conductor winding 34 and over the elongated pole sections 36 on opposite sides of the module. The small sensor coils 66 around each cross core section are also put in place and connected to their respective terminals.

Now, with all module components in place within the mold, all remaining voids in the mold are filled with dry coarse sand. Sand is a preferred dielectric filler material since it provides a minimal restriction to the flow of a binding resin, and when cured, it affords good compression strength and thermal properties as well as satisfactory dielectric strength.

Next, the sand filled mold is flooded with a plastic resin having a low viscosity and sufficient "pot life", i.e. the time before hardening begins to penetrate the sand fill and surrounding cloth in the mold. In order to minimize the chances of having unpenetrated volumes of sand, the liquid resin may first be added after the mold is filled only partially with sand, e.g. up to the level of the steel pole strips. Thereafter, after the cross cores have been installed, more sand can be added to the mold followed by the remaining necessary resin. Finally with the mold filled with sand and resin surrounding the components of the module, the upper surface of the assembly (actually the bottom surface of the completed inductor module as it is installed in a roadway), is covered with a top layer of fiberglass cloth, perferably by folding over the side portions of the cloth 70. The entire inductor assembly is then allowed to cure and harden in the mold.

Although the aforesaid process for assembling a module according to the invention has been described relative to a straight rectangular module, it should be apparent that it also can be utilized to make modules that are curved or that have a "Y" configuration for roadway switches and the like.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An electrical roadway adapted for transmitting power to and controlling inductively coupled vehicles traveling thereon comprising:
    a plurality of elongated inductor modules arranged in an aligned end to end spaced apart order to form a vehicle path, each of said modules being disposed within the roadway adjacent to its upper surface and responsive to an electric current flowing therethrough to generate a magnetic field extending above said surface; and
    inductively controllable means connected to said modules for preventing full operating electric current from flowing through a selected one or more of said plurality of modules and thereby temporarily deactivating the field generating capacity thereof.

2. An inductively coupled modular roadway system for transmitting power to and controlling vehicles traveling thereon, comprising:
    a first inductor module having magnetic core means and a power winding conductor associated therewith connected to an electrical power source;
    a second inductor module also having magnetic core means and an associated power winding conductor connected to the power winding of said first inductor module; and
    a control means connected to said modules and responsive to an inductive control signal for temporarily deactivating said second module by preventing a flow of full operating current through its said power winding.

3. A roadway as described in claim 2 including a sensor coil in one of said inductor modules for producing a control signal to said control means when a vehicle passes over said sensor coil.

4. A roadway as described in claim 2 wherein said control means comprises a relay.

5. A roadway as described in claim 4 wherein said relay comprises:
    first interruptable current conducting means;
    second interruptable current conducting means in parallel with the first conducting means; and time delay means for causing said second conducting means to interrupt a predetermined interval of time after said first conducting means in response to a said control signal.

6. A roadway as described in claim 5 wherein said first conducting means comprises a mercury relay.

7. A roadway as described in claim 5 wherein said second conducting means comprises a solid state switching element.

8. A roadway as described in claim 2 wherein each said inductor module comprises an inductor core having spaced apart pole sections interconnected by a cross core member, and a series of power conductor coils extending longitudinally within said module around said core.

9. A roadway as described in claim 8 wherein said inductor core pole sections are comprised of spaced apart strips of sheet steel and said cross core is comprised of laminated sheets of steel extending between and across said pole sections, and a mixture of dielectric granular particles and resin between said strips of said core pole sections.

10. A roadway as described in claim 8 wherein said granular particles are coarse dry sand and a mixture of said sand and resin filling all voids in said module around said core and conductor coils.

11. A roadway as described in claim 8 wherein said resin comprises polyester resin.

12. A roadway as described in claim 8 wherein said resin comprises epoxy resin.

13. A roadway as described in claim 8 and further comprising a protective covering surrounding said inductor core and said conductive coils.

14. A roadway as described in claim 8 wherein said cross core member is comprised of a plurality of spaced apart sections having the same cross sections, and a separate sensor conductor wrapped around each said core section.

15. A roadway as described in claim 14 including a bypass conductor extending longitudinally within said module between and parallel to said core pole sections, said bypass conductor having a greater cross-sectional area than one of said power conductor coils.

16. A roadway as described in claim 8 including terminal means at both ends of each said module for said power conductor; and jumper means for connecting said terminal means of adjacent modules.

17. A roadway as described in claim 15 including separate terminal means at the end of each said module for said power conductor, said bypass conductor and said sensor coils.

* * * * *